(12) United States Patent
Li (10) Patent No.: US 12,237,852 B1
(45) Date of Patent: Feb. 25, 2025

(54) TRANSMITTER (71) Applicant: Dongguan Chilang Electronics Technology Co.,Ltd., Dongguan (CN)

(72) Inventor: Youbiao Li, Jiujiang (CN)

(73) Assignee: Dongguan Chilang Electronics Technology Co., Ltd., Dongguan (CN)

( * ) Notice: Subject to any disclaimer, the term of this patent is extended or adjusted under 35 U.S.C. 154(b) by 0 days.

(21) Appl. No.: 18/801,877

(22) Filed: Aug. 13, 2024

(30) Foreign Application Priority Data

Jan. 29, 2024 (CN) .......................... 202420221214.0

(51) Int. Cl.
*H04B 1/03* (2006.01)
*H04W 4/18* (2009.01)

(52) U.S. Cl.
CPC ...................................... *H04B 1/03* (2013.01)

(58) Field of Classification Search
CPC ........... H04B 1/03; H04B 1/207; H04W 4/18; H04L 2012/2849; H04L 12/40117; H04L 41/509
See application file for complete search history.

(56) References Cited

U.S. PATENT DOCUMENTS

| | | | | |
|---|---|---|---|---|
| 8,876,545 | B2 * | 11/2014 | Tseng | H01R 31/06 439/376 |
| 11,510,007 | B2 * | 11/2022 | Raley | H04R 27/00 |
| 11,996,878 | B1 * | 5/2024 | Burnett | H04R 3/00 |
| 2009/0092266 | A1 * | 4/2009 | Wu | H04M 1/6066 381/111 |
| 2010/0308187 | A1 * | 12/2010 | Lin | H02J 7/0044 248/206.5 |
| 2015/0105117 | A1 * | 4/2015 | Larson | H04M 1/6066 455/518 |
| 2016/0231980 | A1 * | 8/2016 | Chuang | H04H 20/61 |
| 2017/0195105 | A1 * | 7/2017 | Toba | H04N 21/43635 |
| 2017/0237845 | A1 * | 8/2017 | Yoo | H04M 1/0254 455/557 |
| 2018/0108456 | A1 * | 4/2018 | Yin | F21V 23/005 |
| 2021/0013929 | A1 * | 1/2021 | Bedingham | A61B 5/0205 |

FOREIGN PATENT DOCUMENTS

| | | |
|---|---|---|
| CN | 211856765 U | 11/2020 |
| CN | 213274075 U | 5/2021 |
| CN | 217240691 U | 8/2022 |

* cited by examiner

*Primary Examiner* — Andrew Wendell
(74) *Attorney, Agent, or Firm* — Nitin Kaushik (57) ABSTRACT

According to the technical solutions of the utility model, a transmitter is disclosed and includes a transmitter body, a first connector, and a second connector, where the transmitter body includes a control module, and the control module is configured to convert a target audio analog signal sent by a transmitting device into an audio digital signal and can wirelessly transmit the audio digital signal; the first connector is electrically connected to the control module, is configured to be connected to one type of the transmitting device, and includes an audio plug configured to obtain the target audio analog signal and a power supply connection configured to obtain electric energy; and the second connector is electrically connected to the control module and is configured to be connected to another type of the transmitting device.

9 Claims, 5 Drawing Sheets

TRANSMITTER

CROSS-REFERENCE TO RELATED APPLICATIONS

The application claims priority to Chinese patent application No. 2024202212140, filed on Jan. 29, 2024, the entire contents of which are incorporated herein by reference.

TECHNICAL FIELD

The utility model relates to the technical field of signal transmission, and in particular, to a transmitter.

BACKGROUND

With the development of communication technologies, audio signal transmission is widely applied to people's lives. In the prior art, a transmitting device generally generates an audio analog signal, however, a receiving device generally can only receive an audio digital signal. Therefore, an audio sending signal of the transmitting device and an audio receiving signal of the receiving device are often incompatible, so that audio signal transmission cannot be implemented between the transmitting device and the receiving device. For example, an XBOX game console sends an audio analog signal during open source, however, a wireless headphone in signal transmission with the game console can only receive an audio digital signal. Therefore, an audio sending signal of the XBOX game console is incompatible with an audio receiving signal of the wireless headphone, so that audio signal transmission cannot be implemented between the XBOX game console and the wireless headphone.

In the prior art, a transmitter is generally used to be connected to the XBOX game console through a mini HDMI connecting plug and an audio plug, thereby overcoming a problem that the audio sending signal of the XBOX game console is incompatible with the audio receiving signal of the wireless headphone. However, the transmitter can only be applied to the XBOX game console and has a single application scenario.

SUMMARY

A main purpose of the utility model is to provide a transmitter, to solve a problem of a single application scenario of the transmitter.

According to the technical solutions of the utility model, a transmitter is provided and includes:
  a transmitter body, including a control module, where the control module is configured to convert a target audio analog signal sent by a transmitting device into an audio digital signal and can wirelessly transmit the audio digital signal;
  a first connector, electrically connected to the control module, where the first connector is configured to be connected to one type of the transmitting device and includes an audio plug configured to obtain the target audio analog signal and a power supply connection configured to obtain electric energy; and
  a second connector, electrically connected to the control module, where the second connector is configured to be connected to another type of the transmitting device.

In an embodiment, the transmitter body further includes a housing, and the control module is disposed in the housing; and the transmitter further includes a connecting wire, the connecting wire is connected between the second connector and the control module, the second connector can move relative to the housing through the connecting wire and have a first state and a second state, in the first state, the second connector is mounted in the housing, and in the second state, the second connector is separated from the housing.

In an embodiment, an outer wall of the housing is provided with an accommodating groove, and in the first state, the second connector and at least a part of the connecting wire are disposed in the accommodating groove.

In an embodiment, the housing includes a first housing and a second housing that are spliced with each other, the first housing and the second housing jointly form an accommodating cavity, the control module is disposed in the accommodating cavity, the accommodating groove is formed in outer walls/an outer wall of the first housing and/or the second housing, and a groove bottom of the accommodating groove is provided with a wire-through hole communicated with the accommodating cavity, to allow the connecting wire to pass through.

In an embodiment, the accommodating groove includes a first groove body and a second groove body that are communicated with each other, the first groove body extends along a length direction of the housing, the second groove body is disposed at one end of the first groove body, the other end, away from the second groove body, of the first groove body is provided with the wire-through hole, and in the first state, the connecting wire is disposed in the first groove body, and the second connector is disposed in the second groove body.

In an embodiment, a distance between two opposite groove side walls of the second groove body is greater than a distance between two opposite groove side walls of the first groove body, and a groove depth of the second groove body is greater than a groove depth of the first groove body.

In an embodiment, fixing ribs are disposed on two opposite groove side walls of the second groove body, and in the first state, the fixing ribs abut against the second connector;
  and/or, the second connector is configured as a USB connecting plug.

In an embodiment, the control module includes a circuit board, the circuit board is at least partially disposed in the first housing, an inner wall of the first housing is provided with a convex column, the circuit board abuts against one end of the convex column and is tightly locked with the convex column through a fastener.

In an embodiment, an edge of the circuit board is provided with a limiting notch, a limiting column is disposed on inner walls/an inner wall of the first housing and/or the second housing, and the limiting column passes through the limiting notch;
  and/or, one of the first housing and the second housing is provided with a protrusion, and the other is provided with a buckle adapted to the protrusion.

In an embodiment, the audio plug and the power supply connection are disposed on one side edge of the housing in a width direction at intervals, and the second connector is disposed on the other opposite side edge of the housing in the width direction;
  and/or, one side surface of the housing is provided with a limiting step, and the limiting step is disposed below the first connector.

According to the technical solutions of the utility model, the first connector and the second connector are configured as different types of connectors, so that the transmitter can be connected to different types of transmitting devices, to implement more diverse application scenarios, thereby solving a problem of a single application scenario of the transmitter and providing more selections and convenience.

BRIEF DESCRIPTION OF THE DRAWINGS

To describe the technical solutions in the embodiments of the utility model or in the prior art more clearly, the following briefly describes the accompanying drawings required for describing the embodiments or the prior art. Apparently, the accompanying drawings in the following description show merely some embodiments of the utility model, and a person of ordinary skill in the art may derive other drawings from structures shown in these accompanying drawings without creative efforts.

REFERENCE NUMERALS IN THE DRAWINGS

| Numeral | Name | Numeral | Name |
|---|---|---|---|
| 10 | Transmitter | 110 | Housing |
| 100 | Transmitter body | 111 | First housing |
| 200 | First connector | 112 | Second housing |
| 300 | Second connector | 113 | Accommodating cavity |
| 400 | Connecting wire | 114 | Accommodating groove |
| 210 | Audio plug | 1141 | First groove body |
| 220 | Power supply connection | 1142 | Second groove body |
| 120 | Control module | 115 | Wire-through hole |
| 121 | Circuit board | 116 | Fixing rib |
| 1211 | Limiting notch | 117 | Convex column |
| 119 | Limiting step | 118 | Limiting column |

The purpose realization, functional features, and advantages of the utility model will be further described with reference to the embodiments and the accompanying drawings.

DETAILED DESCRIPTION OF THE EMBODIMENTS

The following clearly and completely describes the technical solutions in the embodiments of the utility model with reference to the accompanying drawings in the embodiments of the utility model. Apparently, the described embodiments are only a part rather than all of the embodiments of the utility model. All other embodiments obtained by a person of ordinary skill in the art based on the embodiments of the utility model without creative efforts shall fall within the protection scope of the utility model.

It should be noted that if directional indications (such as above, under, left, right, front, and rear) are involved in the embodiments of the utility model, the directional indications are only intended for explaining a relative position relationship, a motion condition, and the like, between components in a certain posture (as shown in the accompanying drawings), and if the posture changes, the directional indications change accordingly.

In addition, if the descriptions of "first", "second", and the like is involved in the embodiments of the utility model, the descriptions of "first", "second", and the like are for descriptive purposes only, and cannot be understood to indicate or imply relative importance or implicitly indicate the quantity of indicated technical features. Therefore, defining a feature with "first" and "second" can explicitly or implicitly indicate that at least one of such feature is included. In addition, if "and/or" in the full text means including three parallel solutions. For example, "A and/or B" includes a solution A, a solution B, or a solution in which A and B are satisfied simultaneously. In addition, the technical solutions of various embodiments may be combined with each other, but must be based on implementation of a person of ordinary skill in the art, and when the combination of the technical solutions is contradictory or cannot be implemented, it should be considered that the combination of the technical solutions does not exist, and is not within the protection scope of the utility model.

Figure 1:
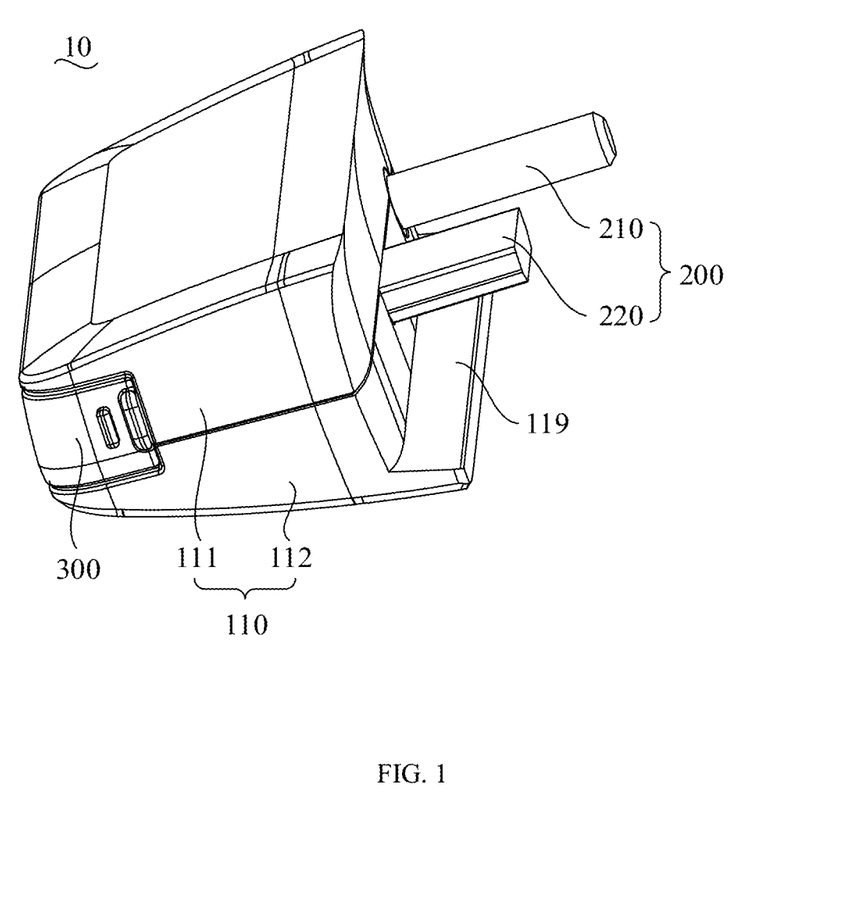
FIG. 1 is a schematic structural diagram of a transmitter of an embodiment in the utility model.
Figure 2:
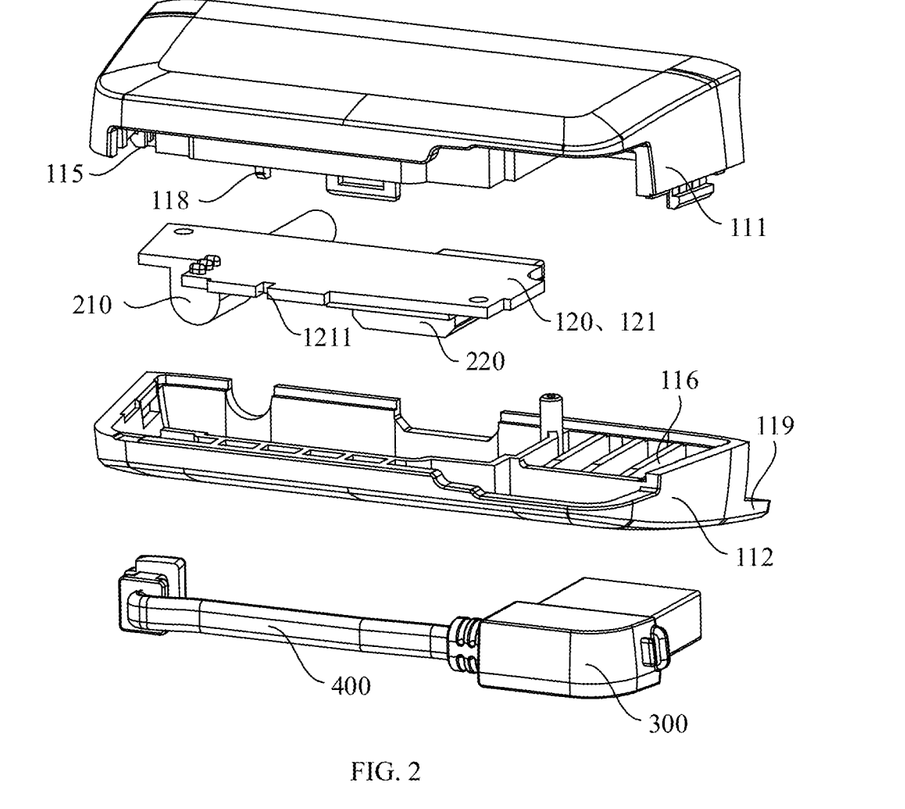
FIG. 2 is an exploded view of a transmitter in FIG. 1.

Referring to FIG. 1 and FIG. 2, the utility model provides a transmitter 10, including a transmitter body 100, a first connector 200, and a second connector 300, where the transmitter body 100 includes a control module 120, and the control module 120 is configured to convert a target audio analog signal sent by a transmitting device into an audio digital signal and can wirelessly transmit the audio digital signal; the first connector 200 is electrically connected to the control module 120, is configured to be connected to one type of the transmitting device, and includes an audio plug 210 configured to obtain the target audio analog signal and a power supply connection 220 configured to obtain electric energy; and the second connector 300 is electrically connected to the control module 120 and is configured to be connected to another type of the transmitting device.

Specifically, the transmitter 10 includes the transmitter body 100, the first connector 200, and the second connector 300, where the first connector 200 is configured to be connected to one type of the transmitting device, and the second connector 300 is configured to be connected to another type of the transmitting device. The two different types of transmitting devices may be different in that types of interfaces, of the transmitting devices, connected to the transmitter 10 are different, or that types of audio signals sent by the transmitting devices are different, for example, one type of the transmitting device sends an audio analog signal, and the other sends an audio digital signal. The first connector 200 and the second connector 300 are configured as different types of connectors, so that the transmitter 10 can be connected to different types of transmitting devices, to implement more diverse application scenarios, thereby solving a problem of a single application scenario of the transmitter 10 and providing more selections and convenience.

The transmitter 10 may be applied to transmitting devices with different types of audio signals. The transmitter body 100 can be connected to one type of the transmitting device through the first connector 200, first convert a target audio analog signal sent by the transmitting device into an audio digital signal, and then wirelessly transmit the converted audio digital signal to a receiving device.

In an embodiment, the transmitting device includes an XBOX gamepad and an XBOX game console, and the receiving device is a wireless headphone that only can receive the audio digital signal. There is a target audio analog signal generated and sent by the XBOX game console in the XBOX gamepad, and the transmitter body 100 obtains the target audio analog signal through the first connector 200, converts the target audio analog signal into an audio digital signal, and then sends the audio digital signal to the wireless headphone, so that audio information of the XBOX gamepad can be received at the wireless headphone terminal.

The first connector 200 includes an audio plug 210 and a power supply connection 220, and an audio interface and a power supply interface are disposed on the transmitting device correspondingly. The audio plug 210 is configured as a 3.5 mm audio plug 210, the audio interface is configured as a 3.5 mm audio interface, and the audio plug 210 is configured to obtain the target audio analog signal. When the audio plug 210 is connected to the audio interface, the transmitter body 100 can obtain the target audio analog signal, so that the transmitting device and the transmitter 10 can implement target audio analog signal transmission. The power supply connection 220 is configured as a mini HDMI connection, the power supply interface is configured as a mini HDMI interface, and the power supply connection 220 is configured to obtain electric energy. When the power supply connection 220 is connected to the power supply interface, the transmitter body 100 can obtain the electric energy, so that the transmitter 10 can continuously obtain the target audio analog signal, convert the target audio analog signal to the audio digital signal, and send the audio digital signal, thereby ensuring that continuous wireless audio signal transmission is implemented between the transmitting device and the receiving device.

The transmitter body 100 further can be connected to another type of the transmitting device through the second connector 300 and wirelessly transmit an audio digital signal sent by the transmitting device to the receiving device directly.

In another embodiment, the transmitting device is a computer, an electronic game console (PS4 and PS5), and the like that can send an audio digital signal, and the receiving device is a wireless headphone that only can receive the audio digital signal. The audio digital signal sent by the computer, the electronic game console (PS4 and PS5), and the like may be transmitted to the transmitter body 100 though the second connector 300, and then the audio digital signal is sent to the wireless headphone, so that audio information of the computer, the electronic game console (PS4 and PS5), and the like can be received at the wireless headphone terminal.

The second connector 300 may be configured as a USB connection, a Type-C connection, a Lightning connection, and the like, and a USB interface, a Type-C interface, and a Lightning interface are correspondingly disposed on the transmitting device. The second connector 300 can obtain the audio digital signal and the electric energy, thereby ensuring that continuous wireless audio signal transmission is implemented between the transmitting device and the receiving device.

The transmitter 10 may be applied to transmitting devices with different types of interfaces. The transmitting device sends the audio analog signal, the first connector 200 is configured to be connected to a transmitting device with one type of interface, and the second connector 300 is configured to be connected to a transmitting device with another type of interface. Whether the transmitter 10 is connected to the transmitting device through the first connector 200 or the second connector 300, the transmitter 10 first converts the target audio analog signal sent by the transmitting device into the audio digital signal and then wirelessly transmits the converted audio digital signal to the receiving device.

The first connector 200 and the second connector 300 are configured as different types of connectors, so that the transmitter 10 may be applied to the XBOX gamepad or the computer, the electronic game console (PS4 and PS5), and the like, thereby solving a problem that the transmitter 10 can only be adapted and applied to the XBOX gamepad to cause a single application scenario of the transmitter 10.

In addition, in another embodiment, the transmitting device is the wireless headphone, and the receiving device is the XBOX gamepad, the XBOX game console, the computer, or the electronic game console (PS4 and PS5). The wireless headphone processes received voice information into a target audio analog signal and sends the target audio analog signal to the transmitter 10, and the transmitter 10 converts the target audio analog signal into an audio digital signal. The transmitter body 100 can send the audio digital signal to the XBOX gamepad through the first connector 200, and the XBOX gamepad sends the audio digital signal to the XBOX game console, so that the XBOX game console can receive the voice information in a wireless transmission manner. The transmitter body 100 further can send the audio digital signal to the computer, the electronic game console (PS4 and PS5), and the like through the second connector 300, so that the computer, the electronic game console (PS4 and PS5), and the like can receive the voice information in a wireless transmission manner.

In an embodiment, the transmitter body 100 further includes a housing 110, and the control module 120 is disposed in the housing 110; and the transmitter 10 further includes a connecting wire 400, the connecting wire 400 is connected between the second connector 300 and the control module 120, the second connector 300 can move relative to the housing 110 through the connecting wire 400 and have a first state and a second state, in the first state, the second connector 300 is mounted in the housing 110, and in the second state, the second connector 300 is separated from the housing 110.

Referring to FIG. 1 and FIG. 2, the transmitter body 100 further includes the housing 110, the control module 120 is mounted in the housing 110, the housing 110 is configured to protect and fix the control module 120 in the housing, to ensure safety and stability of the control module 120. The transmitter 10 further includes the connecting wire 400, configured to connect the second connector 300 to the control module 120, and the connecting wire 400 can transmit the audio signal and the electric energy obtained by the second connector 300 to the control module 120. The connecting wire 400 has a certain length and flexibility, and the second connector 300 can move relative to the housing 110 through the connecting wire 400 and have the first state and the second state. In the first state, the second connector 300 is limited on the housing 110 and is closely connected to the housing 110, to provide stable connection and fixing. The second connector 300 may extend into the housing 110 or may be fixed on an outer surface of the housing 110. In the second state, the second connector 300 is separated from the housing 110 and may move freely, so that the second connector 300 has greater flexibility and adjustability. The second connector may be adjusted and moved according to a requirement of a user, to be adapted to different use scenarios.

In an embodiment, an outer wall of the housing 110 is provided with an accommodating groove 114, and in the first state, the second connector 300 and at least a part of the connecting wire 400 are disposed in the accommodating groove 114.

Referring to FIG. 1 and FIG. 2, the accommodating groove 114 helps protect and fix the second connector 300 and the connecting wire 400. The accommodating groove 114 provides a safe space, so that the second connector 300 and the connecting wire 400 can be mounted in the housing 110 stably. The accommodating groove 114 is formed, so that the second connector 300 and the connecting wire 400 are closely combined with the housing 110, thereby improving stability and reliability of the entire transmitter 10. In addition, the accommodating groove 114 may further function as isolation and protection. The accommodating groove 114 may prevent unnecessary contact and interference between an external environment and the second connector 300 and the connecting wire 400, thereby reducing potential risks of damage and fault and improving durable performance and reliability of the transmitter 10.

In an embodiment, the housing 110 includes a first housing 111 and a second housing 112 that are spliced with each other, the first housing 111 and the second housing 112 jointly form an accommodating cavity 113, the control module 120 is disposed in the accommodating cavity 113, the accommodating groove 114 is formed in outer walls/an outer wall of the first housing 111 and/or the second housing 112, and a groove bottom of the accommodating groove 114 is provided with a wire-through hole 115 communicated with the accommodating cavity 113, to allow the connecting wire 400 to pass through.

Figure 5:
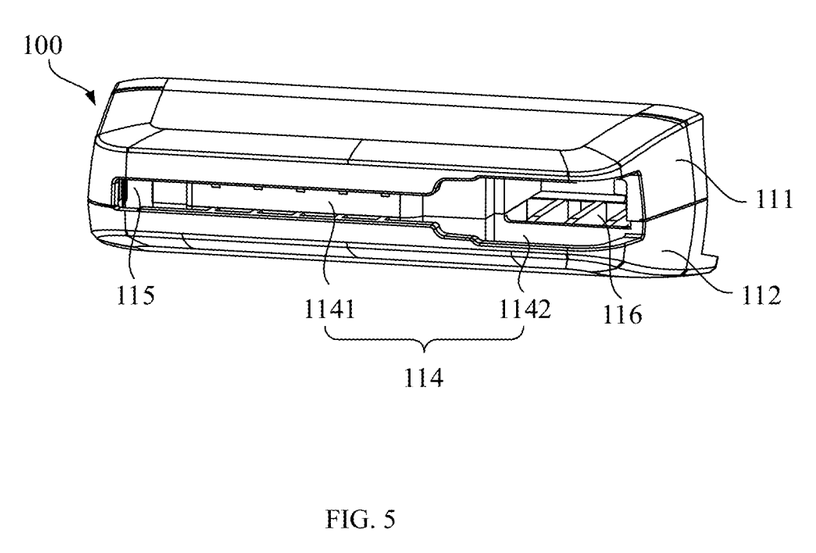
FIG. 5 is a schematic structural diagram of a transmitter body in FIG. 1.

Referring to FIG. 2 and FIG. 5, the housing 110 is formed by the first housing 111 and the second housing 112 that are spliced with each other, and the first housing 111 and the second housing 112 can be disassembled and assembled conveniently and rapidly, to facilitate overhaul of an inner structure of the housing 110. In another embodiment, the housing 110 includes a box body and a box cover; or the housing 110 is integrally formed. The first housing 111 and the second housing 112 jointly form the accommodating cavity 113, and the control module 120 is mounted in the accommodating cavity 113, to ensure safety and stability of the control module. The accommodating groove 114 may be formed in the first housing 111 or the second housing 112; or one part of the accommodating groove may be formed in the first housing 111, and the other part is formed in the second housing 112. The accommodating groove 114 is located outside the housing 110 and is configured to accommodate the connecting wire 400 and the second connector 300. The groove bottom of the accommodating groove 114 is provided with the wire-through hole 115, and the wire-through hole 115 is communicated with the accommodating cavity 113, so that the connecting wire 400 may pass through the wire-through hole 115 to enter into the accommodating cavity 113. Therefore, the connecting wire 400 may be connected to the control module 120, to transmit the audio signal and the electric energy. A position and design of the wire-through hole 115 enables the connecting wire 400 to pass through successfully while maintaining integrity and tightness of the housing 110.

In an embodiment, the accommodating groove 114 includes a first groove body 1141 and a second groove body 1142 that are communicated with each other, the first groove body 1141 extends along a length direction of the housing 110, the second groove body 1142 is disposed at one end of the first groove body 1141, the other end, away from the second groove body 1142, of the first groove body 1141 is provided with the wire-through hole 115, and in the first state, the connecting wire 400 is disposed in the first groove body 1141, and the second connector 300 is disposed in the second groove body 1142.

Referring to FIG. 2 and FIG. 5, the first groove body 1141 extends along the length direction of the housing 110, to provide enough space for accommodating the connecting wire 400. The second groove body 1142 is located at one end of the first groove body 1141 and is configured to accommodate the second connector 300, and the other end, away from the second groove body 1142, of the first groove body 1141 is provided with the wire-through hole 115. The wire-through hole 115 is communicated with the first groove body 1141, the connecting wire 400 passes through the wire-through hole 115 from the accommodating cavity 113 to enter into the first groove body 1141, and the connecting wire 400 extends to the other end of the first groove body 1141 and is connected to the second connector 300. The other end, away from the second groove body 1142, of the first groove body 1141 is provided with the wire-through hole 115, so that the first groove body 1141 can accommodate the longer connecting wire 400, thereby improving flexibility and convenience during connection with the second connector 300.

In an embodiment, a distance between two opposite groove side walls of the second groove body 1142 is greater than a distance between two opposite groove side walls of the first groove body 1141, and a groove depth of the second groove body 1142 is greater than a groove depth of the first groove body 1141.

Referring to FIG. 5, a width size and a height size of the second connector 300 are larger than that of the connecting wire 400. Therefore, the distance between the groove side walls of the second groove body 1142 and the groove depth of the second groove body 1142 are increased, so that the second groove body 1142 may provide a more spacious space, to accommodate the second connector 300 with a larger size. The groove depth of the second groove body 1142 is greater, so that the second connector 300 can be better accommodated in the second groove body 1142, to avoid external interference or damage, which may protect the second connector 300 to a great extent, to ensure safety and stability of the second connector 300.

In an embodiment, fixing ribs 116 are disposed on two opposite groove side walls of the second groove body 1142, and in the first state, the fixing ribs 116 abut against the second connector 300.

Referring FIG. 2 and FIG. 5, the fixing ribs 116 are disposed on the two opposite groove side walls of the second groove body 1142, to ensure stable fixing of the second connector 300. In the first state, the fixing ribs 116 abut against the second connector 300, so that additional support and fixing are provided, stability of the second connector 300 when being placed in the second groove body 1142 is ensured, and loosing or falling off of the second connector 300 can be effectively prevented. The fixing ribs 116 may be configured as a plurality of convex ribs disposed at intervals, to closely match a corresponding part of the second connector 300, and this matching may be implemented in an inserting manner, an embedding manner, or other proper manners, to ensure close combining between the connector and the second groove body 1142. At the same time, the fixing ribs 116 are disposed, so that a size of the second groove body 1142 may be increased, thereby reducing the weight of the housing 110. The fixing ribs 116 may be disposed on two groove side walls of the second groove body 1142 in a vertical direction or two groove side walls of the second groove body 1142 in a horizontal direction. Preferably, the fixing ribs 116 are disposed on the two groove side walls of the second groove body 1142 in the vertical direction, so that a space of the housing 110 in the vertical direction may be sufficiently used, and occupancy of a space of the housing 110 in a length direction may be reduced.

In an embodiment, the second connector 300 is configured as a USB connecting plug.

Referring to FIG. 2, the USB connecting plug has a standardized interface and communication protocol, so that functions of high-speed data transmission and power supply may be implemented. The USB connecting plug may be configured to be connected to the computer, the electronic game console (PS4 and PS5), an external storage device, and other devices, to implement rapid data transmission. The USB connecting plug may be connected to a power adapter, a computer USB interface, and the like for supplying power, and may provide electric power support for the transmitter 10. The USB connecting plug has wide compatibility, may be connected to various USB devices and interfaces, and may be directly connected to a USB 2.0 interface, a USB 3.0 interface, or a USB-C interface. The second connector 300 is configured as the USB connecting plug, so that functions of convenient data transmission and power supply are implemented, and wide compatibility and convenience are provided.

In an embodiment, the control module 120 includes a circuit board 121, the circuit board 121 is at least partially disposed in the first housing 111, an inner wall of the first housing 111 is provided with a convex column 117, the circuit board 121 abuts against one end of the convex column 117 and is tightly locked with the convex column 117 through a fastener.

Figure 3:
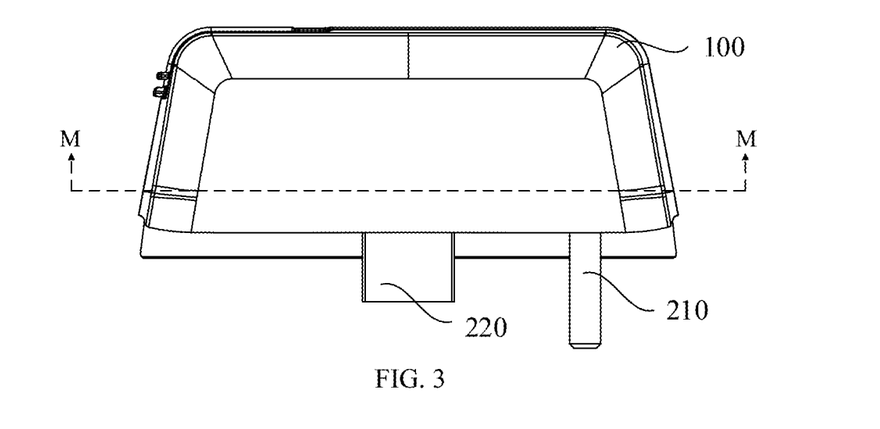
FIG. 3 is a top view of a transmitter in FIG. 1.
Figure 4:
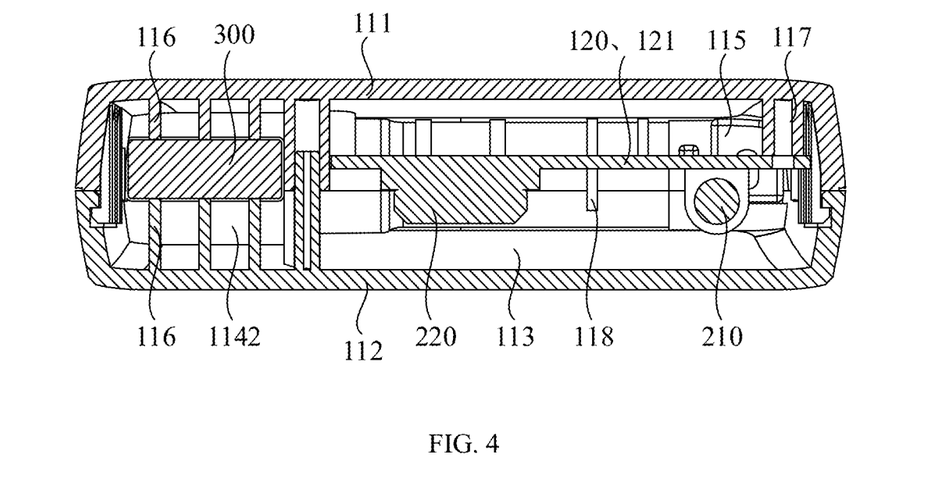
FIG. 4 is a sectional view of a transmitter along line M-M in FIG. 3.

Referring to FIG. 3 and FIG. 4, the control module 120 includes the circuit board 121, and the circuit board 121 is at least partially disposed in the first housing 111. To ensure stability and safety of the circuit board 121, the inner wall of the first housing 111 is provided with the convex column 117. The circuit board 121 abuts against one end of the convex column 117 and is tightly locked with the convex column 117 through the fastener. The fastener may be of various forms, for example, a screw, a nut, and a clamping ring, to ensure firm connection between the circuit board 121 and the convex column 117. For example, one end, abutting against the circuit board 121, of the convex column 117 is provided with a threaded hole, and a bolt passes through the circuit board 121 and is threadedly connected and adapted to the threaded hole, to tightly lock and fix the circuit board 121 with the first housing 111, thereby ensuring stability and safety of the circuit board 121 during use.

In an embodiment, an edge of the circuit board 121 is provided with a limiting notch 1211, a limiting column 118 is disposed on inner walls/an inner wall of the first housing 111 and/or the second housing 112, and the limiting column 118 passes through the limiting notch 1211.

Referring to FIG. 2 and FIG. 4, to ensure correct positioning and position of the circuit board 121 while avoiding shaking of the circuit board 121, the edge of the circuit board 121 is provided with the limiting notch 1211, the limiting column 118 is disposed on the inner walls/the inner wall of the first housing 111 and/or the second housing 112, and the limiting column 118 passes through the limiting notch 1211. The limiting notch 1211 exists to allow the circuit board 121 to match the limiting column 118 mutually during mounting, to ensure the correct positioning and position of the circuit board 121. The limiting column 118 passes through the limiting notch 1211, so that stable connection between the circuit board 121 and the first housing 111 and/or the second housing 112 is formed, thereby preventing the circuit board from moving or loosing during use. There may be one, two, or more limiting notches 1211. The limiting column 118 may be of various forms, for example, a cylinder shape and a square column shape, to ensure matching between the limiting column and the limiting notch 1211. This matching may be implemented in the inserting manner, the embedding manner, or other proper manners, to ensure close combining between the circuit board 121 and the housing 110.

In an embodiment, one of the first housing 111 and the second housing 112 is provided with a protrusion, and the other is provided with a buckle adapted to the protrusion.

The protrusion (not shown in the figure) may be a convex structure formed on a surface of or in the housing 110, and the buckle (not shown in the figure) may be a concave groove or a hole adapted to the protrusion and is configured to be engaged with or inserted into the protrusion mutually, to connect and fix the first housing 111 to the second housing 112. The protrusion and the buckle are respectively disposed in the first housing 111 and the second housing 112, so that firm connection of the housing 110 may be implemented. When the first housing 111 needs to be connected to the second housing 112, the protrusion and the buckle are engaged with or inserted into each other, to ensure close combining between the first housing 111 and the second housing 112 and ensure stability and safety of the housing 110 during use.

In an embodiment, the audio plug 210 and the power supply connection 220 are disposed on one side edge of the housing 110 in a width direction at intervals, and the second connector 300 is disposed on the other opposite side edge of the housing 110 in the width direction.

Referring to FIG. 1 and FIG. 3, to facilitate using the audio plug 210 and the power supply connection 220 simultaneously by a user, the audio plug 210 and the power supply connection 220 are disposed on a same side edge of the housing 110 in the width direction at intervals, and the audio plug 210 and the power supply connection 220 may be adapted and connected to interfaces of the transmitting device simultaneously and accurately. An interval between the audio plug 210 and the power supply connection 220 may be determined according to an actual requirement, to be adapted to different types of connectors and devices. For example, when the user connects the transmitter 10 to the XBOX gamepad, the audio plug and the power supply connection may be adapted to two interfaces of the XBOX gamepad perfectly without mutual interference or hindrance, which may ensure that the user can insert and remove the connector conveniently. At the same time, to provide more connection options and increase application scenarios of the transmitter 10, the second connector 300 is placed on the other opposite side edge of the housing 110 in the width direction. In this way, it may be ensured that the first connector 200 can be closely and stably connected to the transmitting device, to prevent the second connector 300 from interfering with the first connector.

In an embodiment, one side surface of the housing 110 is provided with a limiting step 119, and the limiting step 119 is disposed below the first connector 200.

Referring to FIG. 1 and FIG. 2, the limiting step 119 refers to a convex structure formed on the side surface of the housing 110 and may be used as a positioning reference point when the first connector 200 is inserted, to ensure that the first connector 200 is inserted into a correct position, which helps avoid incorrect insertion or incomplete insertion. The limiting step 119 may provide additional support and stability, to prevent the first connector 200 from loosing or falling off during use.

The above descriptions are only optional embodiments of the utility model, but are not intended to limit the patent scope of the utility model. Any equivalent structural variation made by using the description and the accompanying drawings of the utility model, or directly/indirectly application in other related technical fields under the concept of the utility model shall fall within the patent protection scope of the utility model.

What is claimed is:

1. A transmitter, comprising:
   a transmitter body, comprising a control module, wherein the control module is configured to convert a target audio analog signal sent by a transmitting device into an audio digital signal and can wirelessly transmit the audio digital signal;
   a first connector, electrically connected to the control module, wherein the first connector is configured to be connected to one type of the transmitting device and comprises an audio plug configured to obtain the target audio analog signal and a power supply connection configured to obtain electric energy; and
   a second connector, electrically connected to the control module, wherein the second connector is configured to be connected to another type of the transmitting device,
   wherein the transmitter body further comprises a housing, and the control module is disposed in the housing; and the transmitter further comprises a connecting wire, the connecting wire is connected between the second connector and the control module, the second connector can move relative to the housing through the connecting wire and have a first state and a second state, in the first state, the second connector is mounted in the housing, and in the second state, the second connector is separated from the housing.

2. The transmitter according to claim 1, wherein an outer wall of the housing is provided with an accommodating groove, and in the first state, the second connector and at least a part of the connecting wire are disposed in the accommodating groove.

3. The transmitter according to claim 2, wherein the housing comprises a first housing and a second housing that are spliced with each other, the first housing and the second housing jointly form an accommodating cavity, the control module is disposed in the accommodating cavity, the accommodating groove is formed in outer walls/an outer wall of the first housing and/or the second housing, and a groove bottom of the accommodating groove is provided with a wire-through hole communicated with the accommodating cavity, to allow the connecting wire to pass through.

4. The transmitter according to claim 3, wherein the accommodating groove comprises a first groove body and a second groove body that are communicated with each other, the first groove body extends along a length direction of the housing, the second groove body is disposed at one end of the first groove body, the other end, away from the second groove body, of the first groove body is provided with the wire-through hole, and in the first state, the connecting wire is disposed in the first groove body, and the second connector is disposed in the second groove body.

5. The transmitter according to claim 4, wherein a distance between two opposite groove side walls of the second groove body is greater than a distance between two opposite groove side walls of the first groove body, and a groove depth of the second groove body is greater than a groove depth of the first groove body.

6. The transmitter according to claim 4, wherein fixing ribs are disposed on two opposite groove side walls of the second groove body, and in the first state, the fixing ribs abut against the second connector;
   and/or, the second connector is configured as a USB connecting plug.

7. The transmitter according to claim 3, wherein the control module comprises a circuit board, the circuit board is at least partially disposed in the first housing, an inner wall of the first housing is provided with a convex column, the circuit board abuts against one end of the convex column and is tightly locked with the convex column through a fastener.

8. The transmitter according to claim 7, wherein an edge of the circuit board is provided with a limiting notch, a limiting column is disposed on inner walls/an inner wall of the first housing and/or the second housing, and the limiting column passes through the limiting notch;
   and/or, one of the first housing and the second housing is provided with a protrusion, and the other is provided with a buckle adapted to the protrusion.

9. The transmitter according to claim 1, wherein the audio plug and the power supply connection are disposed on one side edge of the housing in a width direction at intervals, and the second connector is disposed on the other opposite side edge of the housing in the width direction;
   and/or, one side surface of the housing is provided with a limiting step, and the limiting step is disposed below the first connector.

* * * * *